(12) United States Patent
Stevenson et al.

(10) Patent No.: US 9,304,371 B2
(45) Date of Patent: Apr. 5, 2016

(54) PHOTON SOURCE

(71) Applicants: Richard Mark Stevenson, Cambridge (GB); Joanna Krystyna Skiba-Szymanska, Cambridge (GB); Anthony John Bennett, Cambridge (GB); Andrew James Shields, Cambridge (GB)

(72) Inventors: Richard Mark Stevenson, Cambridge (GB); Joanna Krystyna Skiba-Szymanska, Cambridge (GB); Anthony John Bennett, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 633 days.

(21) Appl. No.: 13/727,058

(22) Filed: Dec. 26, 2012

(65) Prior Publication Data

US 2013/0256504 A1 Oct. 3, 2013

(30) Foreign Application Priority Data

Mar. 30, 2012 (GB) .................................. 1205787.3

(51) Int. Cl.
*H04B 10/02* (2006.01)
*G02F 1/225* (2006.01)
*G06N 99/00* (2010.01)
*G02F 1/017* (2006.01)
*B82Y 10/00* (2011.01)
*B82Y 20/00* (2011.01)

(52) U.S. Cl.
CPC ............... *G02F 1/2257* (2013.01); *B82Y 10/00* (2013.01); *B82Y 20/00* (2013.01); *G02F 1/01708* (2013.01); *G06N 99/002* (2013.01); *G02F 2001/01791* (2013.01); *G02F 2202/32* (2013.01)

(58) Field of Classification Search
CPC ......... H04B 10/25; H04B 10/50; H04B 10/70
See application file for complete search history.

(56) References Cited

U.S. PATENT DOCUMENTS

| 8,670,672 B2* | 3/2014 | Stevenson et al. ............ 398/141 |
| 9,100,131 B2* | 8/2015 | Madey et al. |
| 2002/0196827 A1* | 12/2002 | Shields et al. .................. 372/45 |
| 2009/0173892 A1* | 7/2009 | Courtney et al. .......... 250/484.4 |
| 2012/0014837 A1* | 1/2012 | Fehr et al. .................. 422/82.11 |

FOREIGN PATENT DOCUMENTS

WO WO 2008/064407 A1 6/2008

OTHER PUBLICATIONS

Office Action issued May 7, 2014 in Japanese Patent Application No. 2013-040429 with English language translation.

(Continued)

*Primary Examiner* — Dzung Tran
(74) *Attorney, Agent, or Firm* — Oblon, McClelland, Maier & Neustadt, L.L.P.

(57) ABSTRACT

An optical device comprising a quantum dot provided in a resonant confinement structure, an output from said confinement structure and a pulsed excitation source for said quantum dot, wherein the quantum dot is configured to allow the emission of photons having a first energy in response to a pulse from said excitation source, said resonant confinement structure providing optical confinement, the first energy being different to the resonant energy of the resonant confinement structure, the optical device further comprising a timing unit, said timing unit being configured to select photons which have been emitted from the quantum dot due to excitation by a pulse, the timing unit selecting photons emitted after the duration of the pulse which caused the emission of the photons.

16 Claims, 12 Drawing Sheets

(56) References Cited

OTHER PUBLICATIONS

United Kingdom Patents Act 1977: Combined Search and Examination Report under Sections 17 and 18(3) issued Sep. 6, 2012, in GB Application No. GB1205787.3.

P. M. Intallura, et al., "Quantum key distribution using a semiconductor quantum dot source emitting at a telecommunication wavelength", Proceedings of the SPIE, vol. 6902, 69020G, Quantum Dots, Particles and Nanoclusters V, 2008, pp. 69020G-1-10.

S. Ates, et al., "Post-Selected Indistinguishable Photons from the Resonance Flourescence of a Single Quantum Dot in a Microcavity", Physical Review Letters, vol. 103, Oct. 16, 2009, pp. 167402-1-4.

* cited by examiner

Top View

Side View

PHOTON SOURCE

FIELD

Embodiments described herein generally relate to photon sources.

BACKGROUND

The coherence time of a light source is a well known property that describes the nature of the photon wavepackets. One of the primary reasons coherence time is important is to enable high visibility two-photon interference. The applications of this technique with quantum dot photon sources include optical quantum computing and quantum repeaters for quantum key distribution.

Currently, the standard approach to improve coherence times in quantum dots is to do one or both of the following things. First, the amount of charge created outside the quantum dot can be reduced by exciting preferably fully resonantly, or otherwise quasi-resonantly with the quantum dot. Second, optical cavity designs such as micropillars and photonic crystals may be employed to confine the optical mode to a small volume in the vicinity of the quantum dot, thus enhancing the radiative rate via the Purcell effect. In this case, the photon is radiated over a shorter period of time, giving the local electric field less time to fluctuate, and increasing the coherence time to lifetime ratio which improves two-photon-interference.

BRIEF DESCRIPTION OF THE DRAWINGS

FIG. 12 is a schematic of a device in accordance with an embodiment of the present invention having a ridge waveguide.

DETAILED DESCRIPTION

Figure 1:
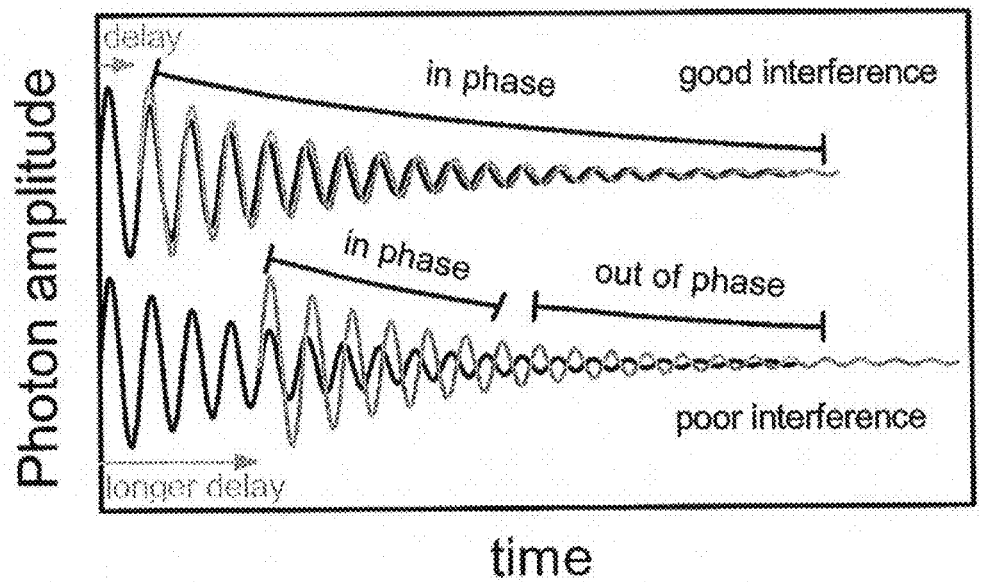
FIG. 1 is a plot of photons amplitude against time demonstrating coherence.

An optical device comprising a quantum dot provided in a resonant confinement structure, an output from said confinement structure and a pulsed excitation source for said quantum dot, wherein the quantum dot is configured to allow the emission of photons having a first energy in response to a pulse from said excitation source, said resonant confinement structure providing optical confinement, the first energy being different to the resonant energy of the resonant confinement structure, the optical device further comprising a timing unit, said timing unit being configured to select photons which have been emitted from the quantum dot due to excitation by a pulse, the timing unit selecting photons emitted after the duration of the pulse which caused the emission of the photons.

In some embodiments, the first energy is less than the energy of the resonant energy of the resonant confinement structure.

The output may be provided by a waveguide. In one embodiment, the said resonant confinement structure is provided by a waveguide such that the waveguide provides both the confinement and the output. In a further embodiment, said resonant confinement structure comprises a cavity coupled to a quantum dot and wherein the output is provided by a waveguide. In this embodiment, the cavity is non resonant with the first energy.

In an embodiment, there is a difference of at least 5 nm between the wavelength corresponding to the first energy and the wavelength corresponding to the resonant energy of the waveguide or confinement structure.

Various arrangements for the waveguide are possible, for example at least one selected from a nanopillar, a ridge waveguide or a photonic band gap structure.

In a further embodiment, the photon source comprises a first and second waveguide, the first and second waveguides being located in the same plane and perpendicular to one another, the quantum dot being provided in, or coupled to, both waveguides.

A quantum relay may be provided which uses the above optical device with two waveguides, the optical device is configured to output an entangled photon pair, where one photon of the pair is directed towards a first unit and the other photon of the entangled pair is directed towards a second unit, the relay further comprising an input for a photon with a target state to said first unit, the first unit comprising an interferometer and a measuring section, the interferometer configured to interfere the input photon with the target state with a photon of the entangled photon pair and the measurement section configured to measure the interfered photons such that the target state is teleported to the other photon of said entangled pair.

The pulsed excitation source may be an optical source or an electrical source.

Selection of the photons may be performed just after the photons exit the source or the photons may be post selected. Therefore, in an embodiment, the device further comprises a detector configured to detect photons emitted from the waveguide, wherein the timing unit is configured to select photons after detection by the detector.

In a further embodiment, the optical device further comprises a component configured to manipulate the photons emitted by the quantum dot before they reach the detector. For example, the component may be an interferometer, polarisation rotator, acousto-optic-modulator, shutter, or incorporate a phase modulator.

The timing unit may comprise many different components configured to select photons for example, a time-interval discriminator, a fast-optical switch or a time-dependent attenuator etc.

In a further embodiment, the timing unit is configured to select photons emitted 100 ps after the end of the pulse.

In a further embodiment, a method of producing photons is provided, said method comprising:

emitting photons from a quantum dot into a resonant confinement structure using a pulsed excitation source, wherein the quantum dot is configured to allow the emission of photons having a first energy in response to a pulse from said excitation source, said resonant confinement structure providing optical confinement, the first energy being different to the resonant energy of the resonant confinement structure; and selecting photons which have been emitted from the quantum dot due to excitation by a pulse, by temporally selecting photons emitted after the duration of the pulse which caused the emission of the photons.

FIG. 1 is a plot of the amplitude of the received radiation over time. The plot shows how the coherence time affects an example single photon wavepacket. A photon wavepacket can be visualised by considering the electric field as a function of time. If the start of a photon wavepacket is delayed by a small amount as shown in the top trace, then the electric field oscillates at the same rate as an un-delayed photon. Thus the photons are coherent, and strong interference effects can be observed.

However, if the example photon wavepacket is delayed a larger amount as shown in the lower trace, the oscillations do not always match with the un-delayed photon, and the electric field oscillations go from being in and out of phase. The coherence between these photon wavepackets for this delay is therefore poor, and will give rise to poor interference averaged over the whole wavepacket. The delay required for the interference visibility to drop to 1/e is the coherence time of the photon.

Figure 2:
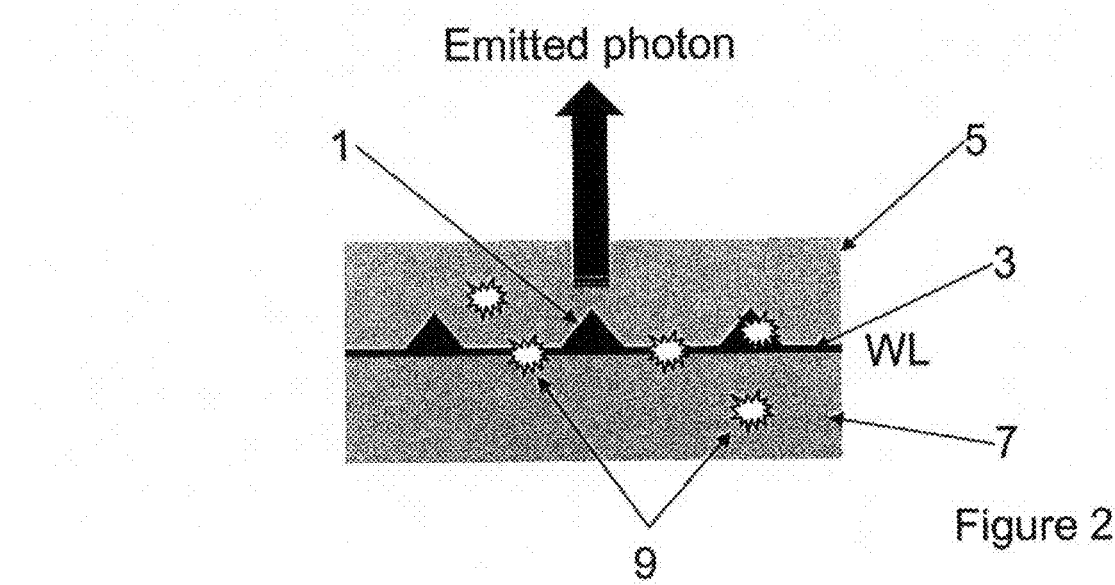
FIG. 2 is a basic schematic of a single photon emitter.

A photon source may be fabricated from a quantum dot. Such an arrangement is shown in FIG. 2. Here, a quantum dot one is formed by a thin layer of material 3 at the interface three between an upper layer 5 and a lower layer 7. The quantum dot 1 is illuminated with radiation (not shown) and a single photon is emitted from the quantum dot.

In such an arrangement, where quantum dots are formed in bulk semiconductors, observed coherence times are typically far from the theoretical time-bandwidth limited maximum of twice the radiative lifetime. The value can be a few 100 ps, compared to a potential maximum of 2×1 ns, where 1 ns is the typical radiative lifetime of a quantum dot in bulk semiconductor. This drop in the observed coherence time is usually attributed to frequency fluctuations of the quantum dot exciton state, caused by environmental effects, particularly fluctuating local charge environments (indicated as 9 on FIG. 2) created by the excitation optical or electrical pulse.

Figure 3:
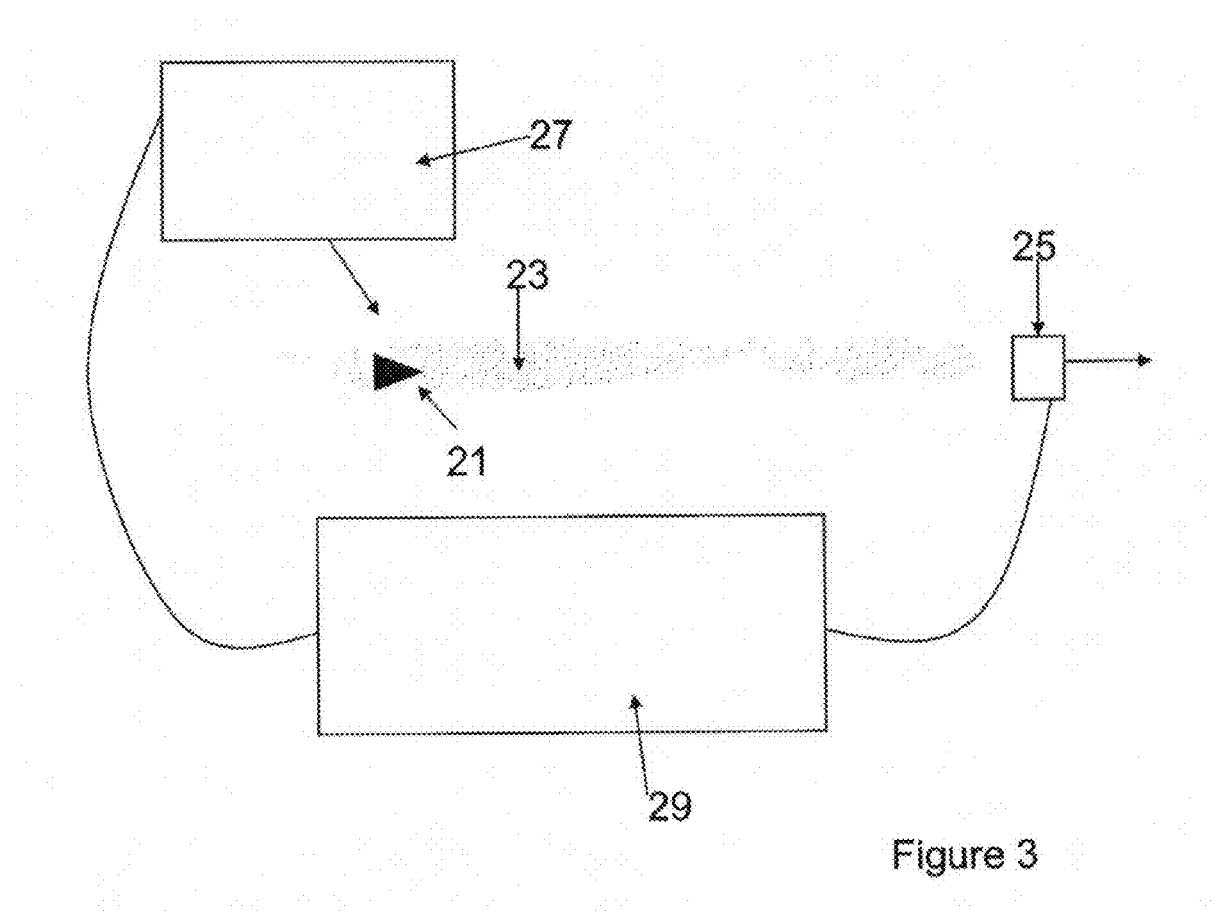
FIG. 3 is a schematic of a photon source in accordance with an embodiment of the present invention.

A photon source in accordance with an embodiment of the present invention is shown in FIG. 3.

The photon source of FIG. 3 comprises a quantum dot 21 formed in a confinement structure such as waveguide 23. A timing gate 25 is provided at the output of waveguide 23. The provision of timing gate 25 allows the system of FIG. 3 to measure the time when a photon is outputted from waveguide 23. This allows the system to distinguish between photons on the basis of time.

A laser 27 is provided to illuminate quantum dot 21 with a source of pulsed radiation. In this particular embodiment, an optical source is used. However, it is also possible for a pulsed electrical source to be used in order to generate output from quantum dot 21. How this is achieved will be described with reference to FIG. 14.

Both the timing gate 25 and the laser 27 are controlled via timing control 29. Timing controller 29 allows the timing measured by timing gate 25 to be synchronised to the output of the laser 27.

The waveguide is configured so that it is suppresses the radiative rate of the quantum dot. This can be achieved via Purcell suppression.

Figure 4:
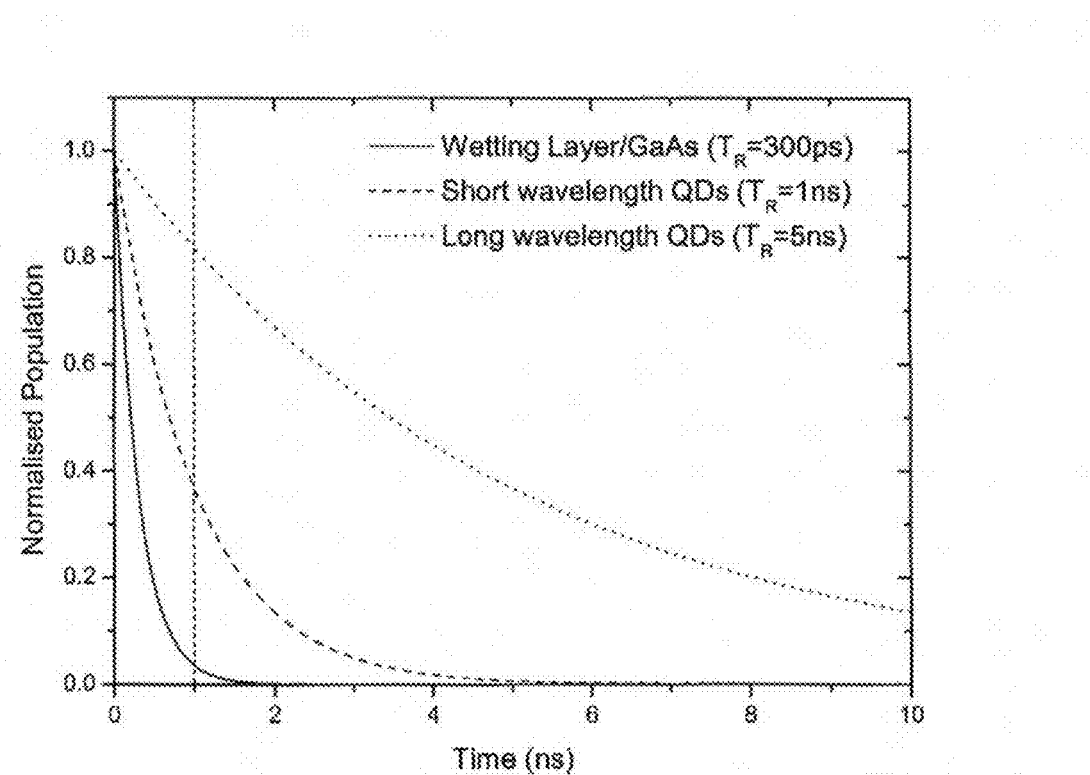
FIG. 4 is a plot of the normalised population against time after excitation in a single photon source.

FIG. 4 is a plot of the normalised population of excited charge over time. The lower trace corresponds to excited charge near the quantum dot, the middle trace corresponds to the emission of a quantum dot in a structure with no Purcell Suppression and the upper trace to the emission of a quantum dot in a structure with Purcell Suppression.

By suppressing the radiative rate of a quantum dot via Purcell suppression, the radiative lifetime will be significantly increased. This will allow photon emission to extend beyond the time required for the electrical or optical excitation pulse to be switched off, and the local carriers near the quantum dot that they created to dissipate. Thus for much of the extended photon wavepacket there will be very little local charge near the dot, so the energy of the exciton will be stable, resulting in strong coherence. It can be seen that the long lived emission line in the presence of Purcell Suppression exists predominantly after locally created charge is quenched.

The initial part of the wavefunction will be generated when local charge created by the excitation pulse exists. Although this part of the wavefunction may be only a small fraction of the total photon wavepacket, the timing gate 25 is used, in this embodiment, to substantially block this part of the output.

The vertical dashed line of FIG. 4 shows an example of a threshold which can be set to remove unwanted photons from the output.

The above embodiment, suppresses spontaneous emission. In a further embodiment, to the repetition period of the pulsed radiation or other pulsed source exceeds the radiative lifetime.

In a yet further embodiment, the photons are well directed towards collection optics (not shown). Possible examples of the collection optics are lenses coupled to optical fibres.

A device in accordance with the embodiment described with reference to FIG. 3, is achieved by placing a quantum dot within a waveguide having a higher resonant energy than the photon emission. In this situation, the electric field will not be well confined within the waveguide core, reducing the interaction with the quantum dot and causing suppression of the radiative decay rate. However, those photons that are emitted are generally directed along the waveguide towards the collection optics.

Figure 5:
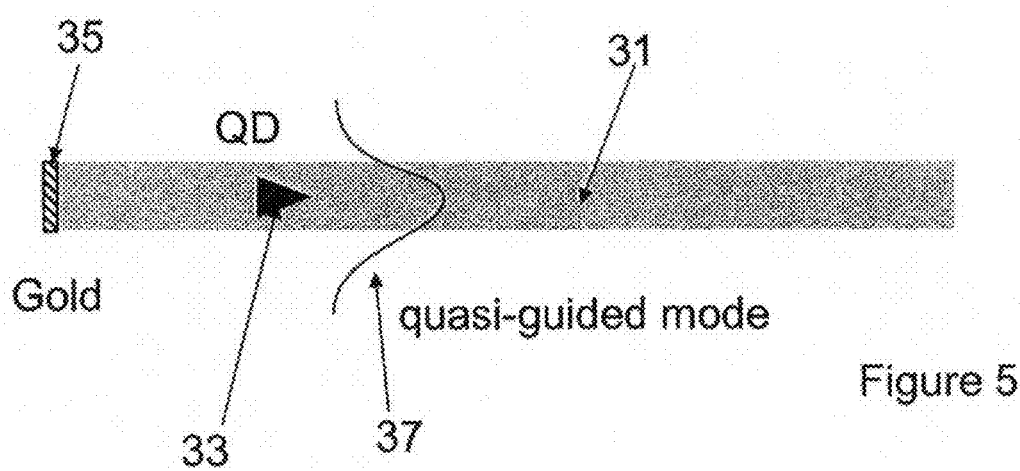
FIG. 5 is a schematic of a waveguide and quantum dot in accordance with an embodiment present invention.

FIG. 5 shows an embodiment, based on a waveguide 31 which is non-resonant with quantum dot 33. A gold reflector 35 is provided on one side of the quantum dot, in order that all photons are directed the same way. Thus the emitted photons 37 are quasi guided by waveguide 31. A timing gate (not shown) may be placed at the end of the waveguide to select photons which have been emitted at or after a certain time after the pulse of radiation used to excite the photons has been received by the quantum dot.

Figure 6A:
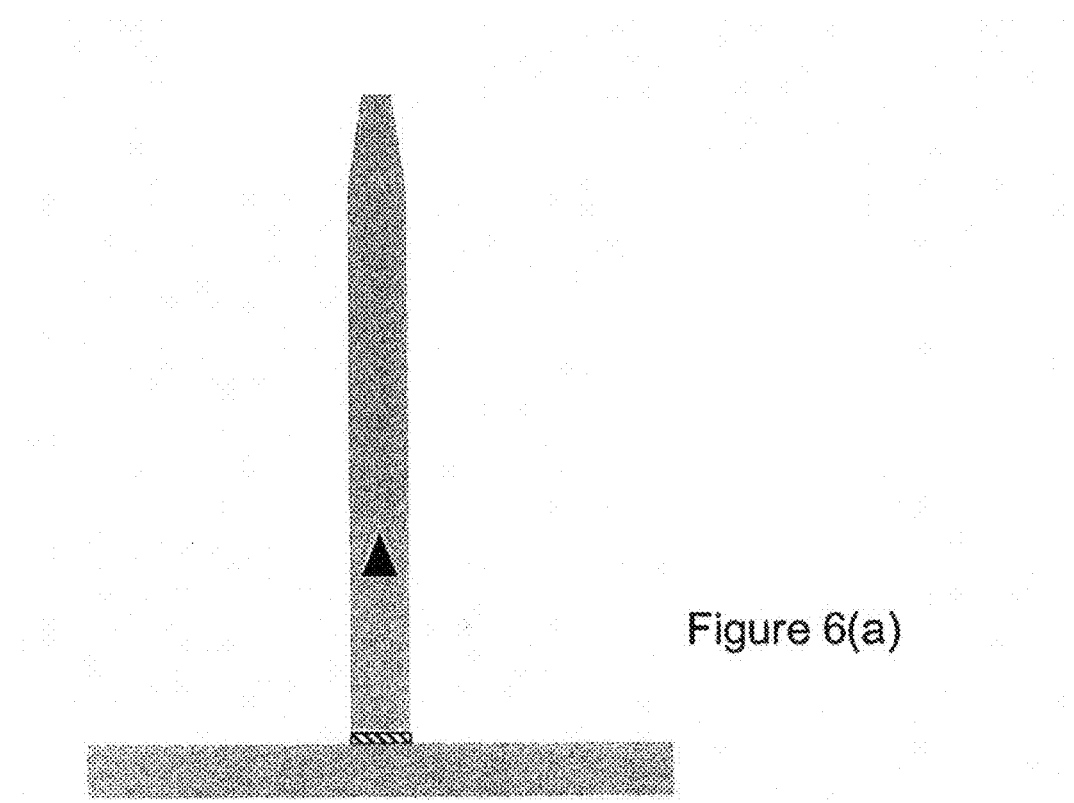
FIG. 6(a) is a schematic of a device in accordance with an embodiment of the present invention having a nanopillar.
Figure 6B:
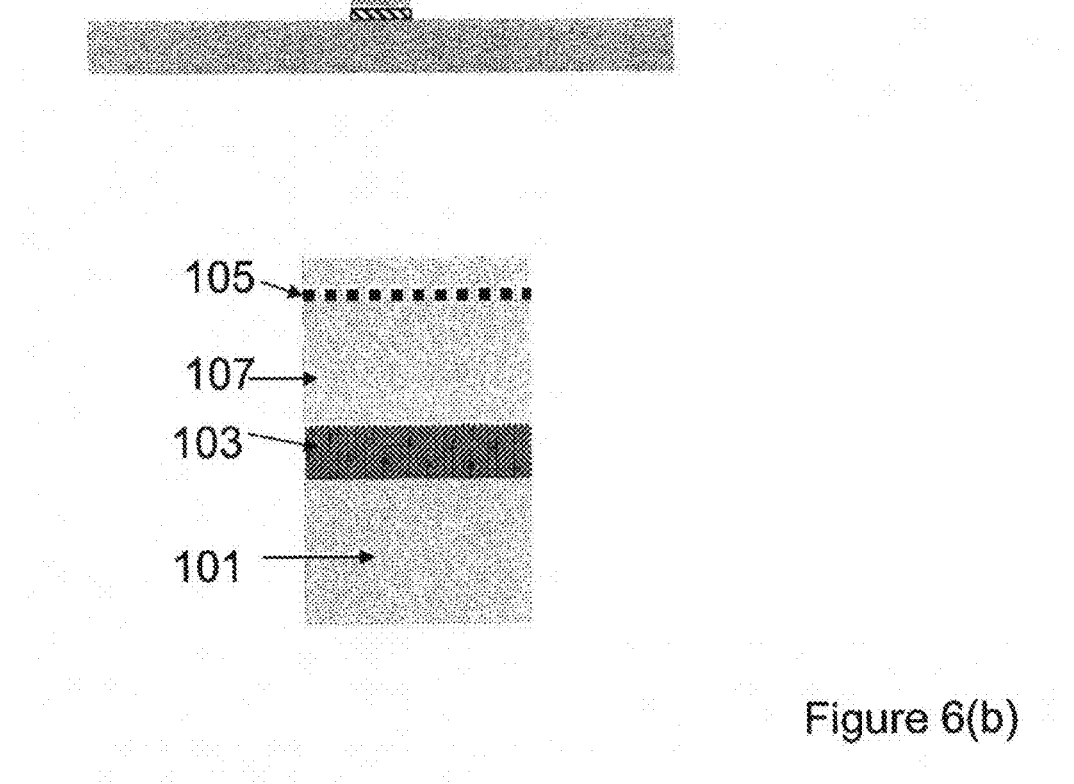
FIG. 6(b) is a schematic of the layer structure used to form the device of FIG. 6(a)

FIG. 6(a) is a schematic of a photon source in accordance with a further embodiment of the present invention. In the embodiment of FIG. 6(a), a non-resonant waveguide formed from a semiconductor nanopillar. In one embodiment, this is formed by growing a planar structure by molecular beam epitaxy as shown in FIG. 6(b). The structure comprises an array of quantum dots 105 buried in a layer of GaAs 107. In this particular example, the GaAs layer was 2.5 μm thick and lies upon a 300-nm-thick $Al_{0.8}Ga_{0.2}As$ sacrificial layer 103 and a GaAs substrate 101.

Figure 7:
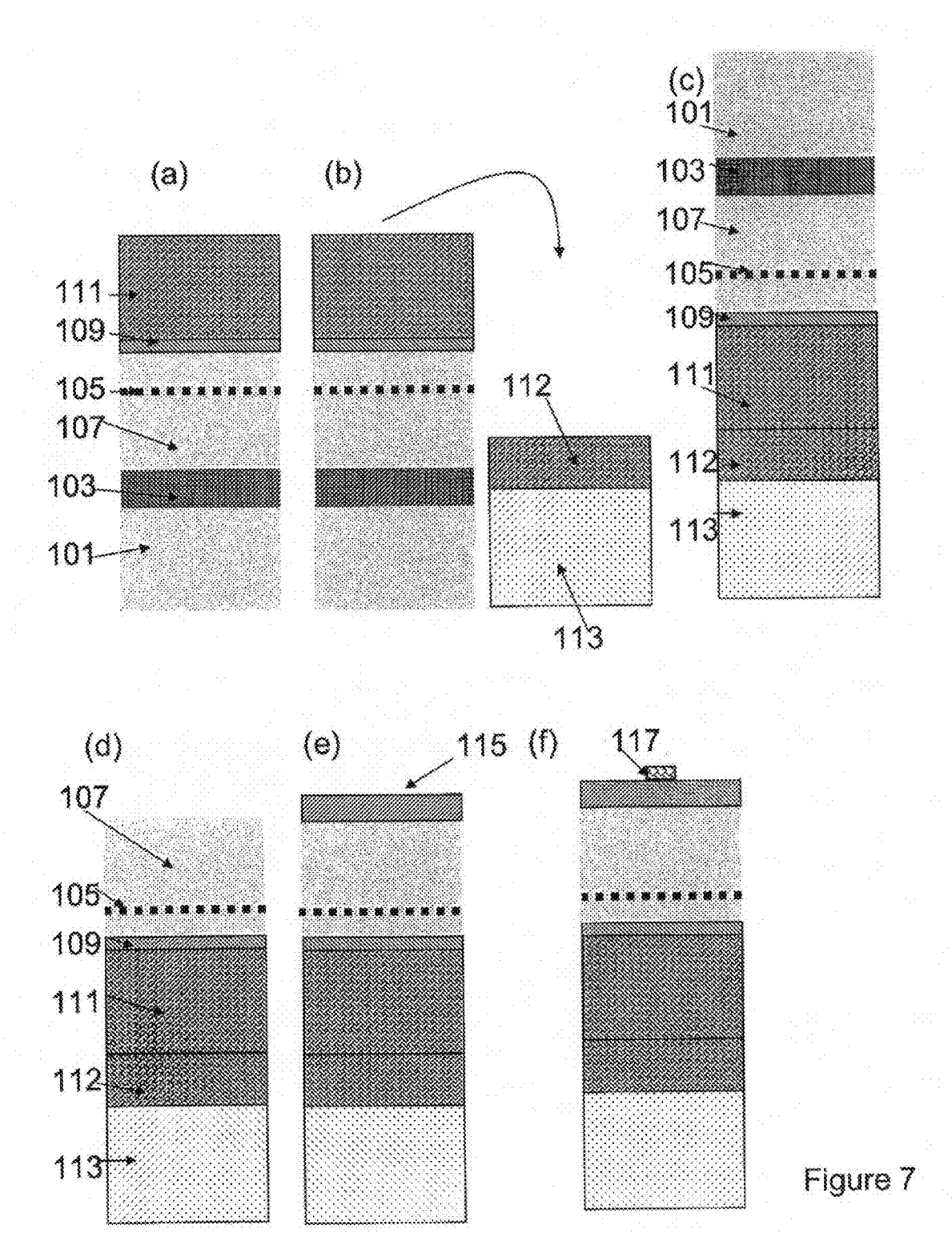
FIGS. 7(a) to (i) are diagrams showing the various fabrication stages to form the device of FIG. 6(a)
Figure 7:
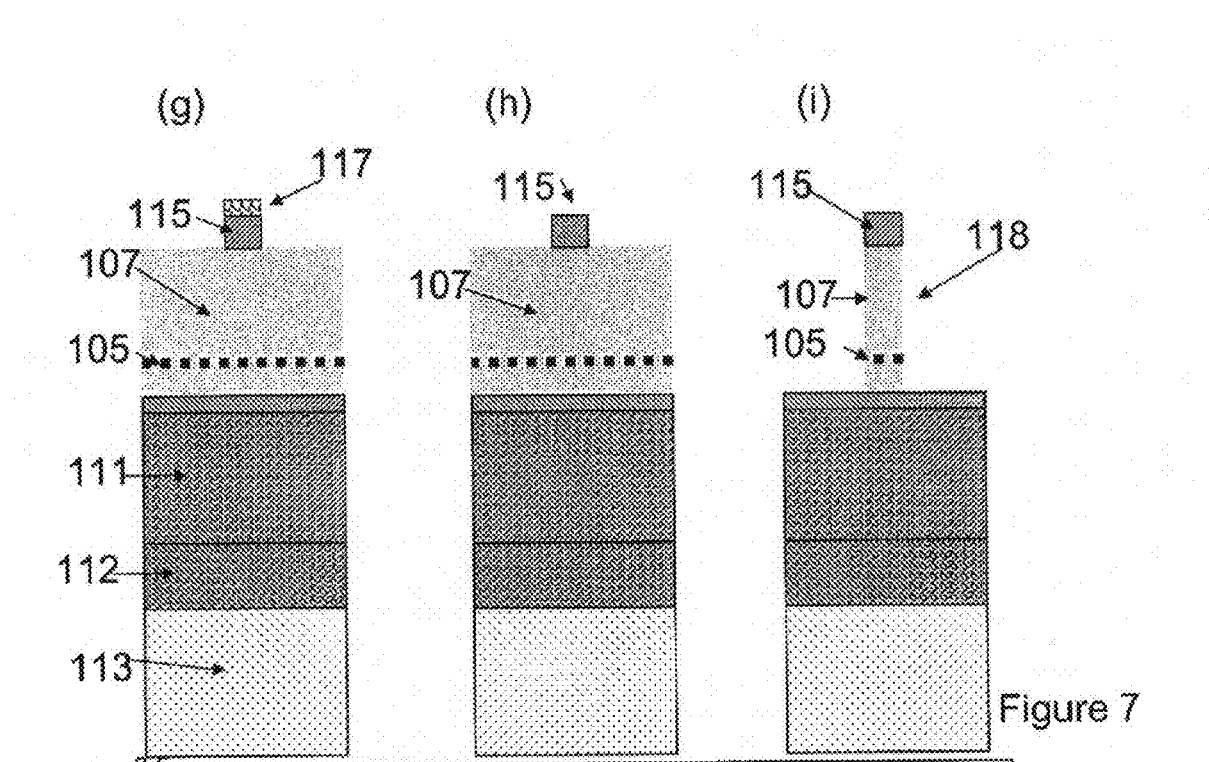

FIG. 7 shows the fabrication process flow. In FIG. 7(a) a composite mirror, comprising $SiO_2$ (14 nm) 109 and over 300 nm of gold 111, is deposited on top of the epitaxial sample described with reference to FIG. 6(b). To avoid an unnecessary repetition, like references denote like features.

In FIG. 7(b), a flip-chip step is performed where the gold layer 111 of the structure of FIG. 7(a) is thermally bonded onto a GaAs carrier wafer 113 which surface is covered with gold 112. The structure which is formed is shown in FIG. 7(c). Next, the substrate of the growth wafer 101 and the sacrificial layer 103 are removed by mechanical polishing and selective wet etching, leaving a mirror-flat as demonstrated in FIG. 7(d).

$Si_3N_4$ hard mask 115 was deposited on the top surface of the bonded chip as shown in FIG. 7(e). An electron-beam lithography step is used to define arrays of aluminium disks 117 which are shown in profile in FIG. 7(f).

A dry etching of a hard mask based on $CHF_3+O_2$ is employed to transfer the pattern defined in aluminium 117 into the $Si_3N_4$ layer 115 as shown in step 7(h). Then the structures are finally etched using plasma etching based on $SiCl_4$ chemistry to form pillar 118 as shown in step 7(i). The nanopillar 118 comprises quantum dots 105.

Figure 8:
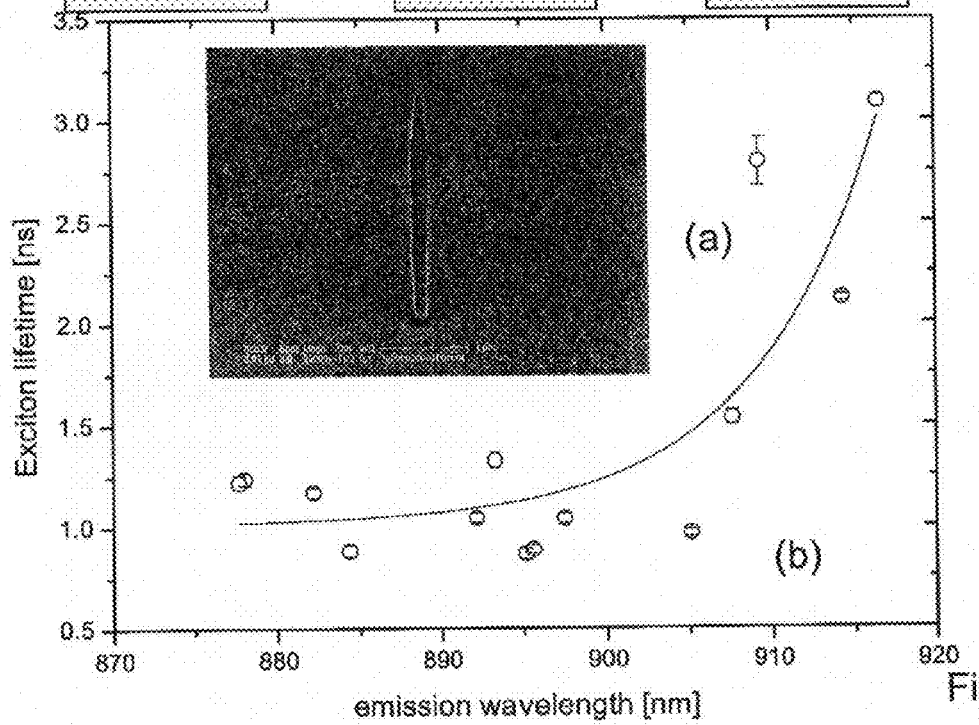
FIG. 8(a) is a photograph of a nanopillar and FIG. 8(b) is a plot of the exciton life time in nanoseconds against emission wavelength.

The $Si_3N_4$ hard mask 115 is then removed to form the nanopillar. In an embodiment, the tip of the nanopillar 118 tapers as shown in FIG. 8(a). This aids photons to adiabatically escape into free space rather than suffer reflection at the semiconductor/air interface. The geometry of the taper can be defined by controlling the etch reaction.

FIG. 8(b) is a plot showing the exciton lifetime against emission wavelength. The results are collected from a nanopillar with nominal diameter of 200 nm, containing a plurality of quantum dots. The radiative lifetime of quantum dots within the nanopillar is shown, as a function of the quantum dot emission energy. There is a strong tendency for longer wavelength quantum dots to have longer lifetimes, which is attributed to the waveguide core being too small to confine photons well beyond a wavelength of ~905 nm.

Figure 9:
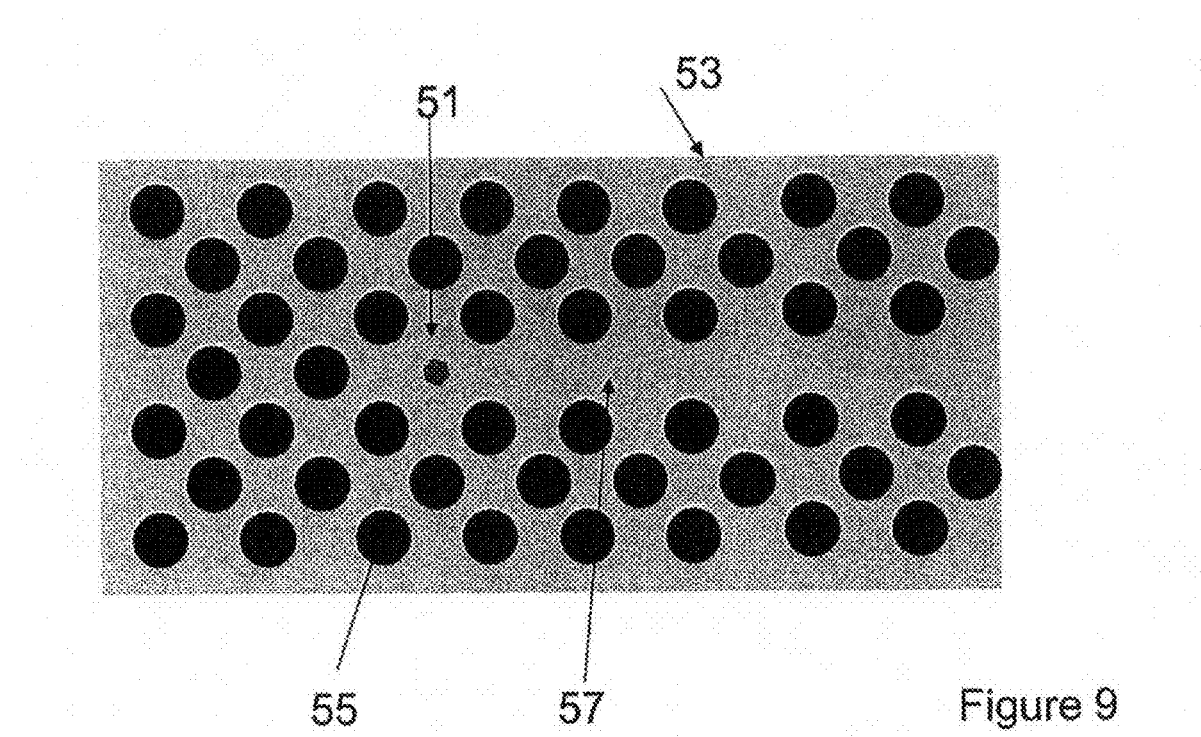
FIG. 9 is a device in accordance with an embodiment of the present invention where the waveguide is formed using a photonic band gap (PBG) structure.

FIG. 9 is a schematic of a photon source in accordance with a further embodiment of the present invention. Here, the quantum dot 51 is formed in a photonic crystal structure 53. The photonic crystal structure 53 comprises a plurality of holes 55 which are either empty or filled with a material having a different dielectric constant to that of the surrounding material 57. A channel 57 or row defect is formed from quantum dot to collection optics (not shown) in the channel forms a waveguide of the type described with reference to FIG. 3. The resonant energy of the waveguide is different to that of the resonant energy of the quantum dot 51 and hence Purcell suppression occurs.

Figure 10:
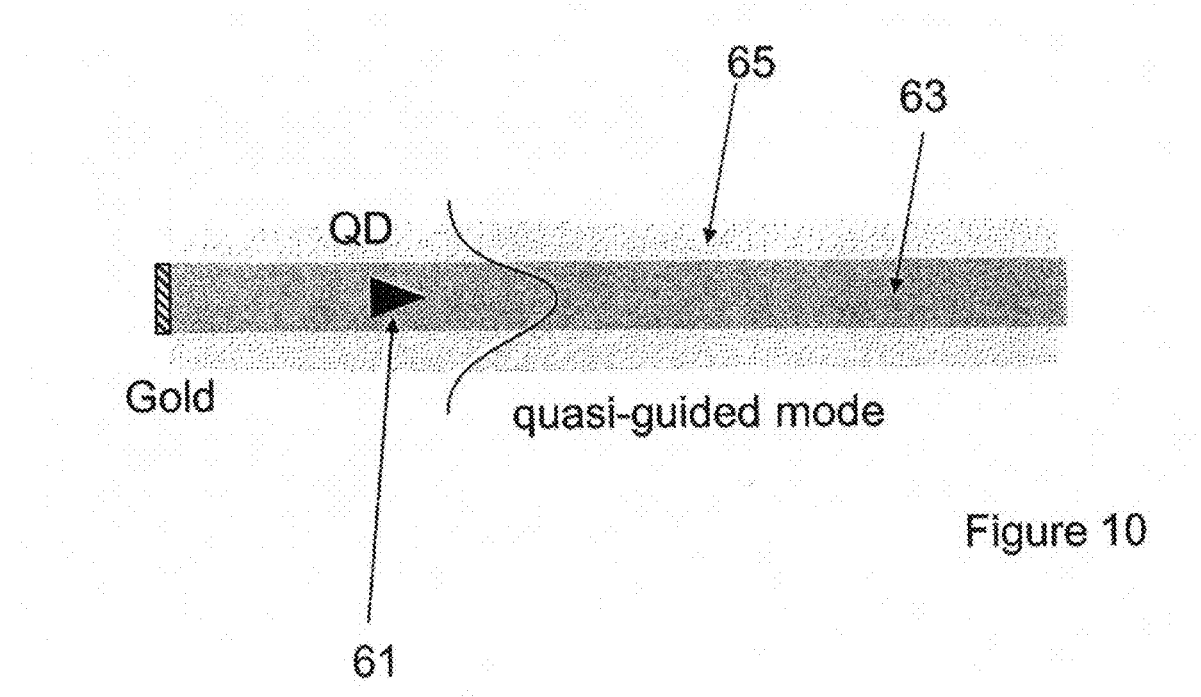
FIG. 10 is a device in accordance with an embodiment of the present invention with a coated waveguide.

FIG. 10 is a photon source in accordance with a further embodiment of the present invention. The photon source comprises a quantum dot 61 which is located in a waveguide 63. As above, the resonant energy of the waveguide 63 is higher than the emission energy of the quantum dot 61. A dielectric cladding 65 is positioned to provide confinement to the waveguide 63. In one embodiment, the dielectric clad waveguide is fabricated by adding a coating of silicon nitride to the nanopillar of FIG. 6.

Figure 11:
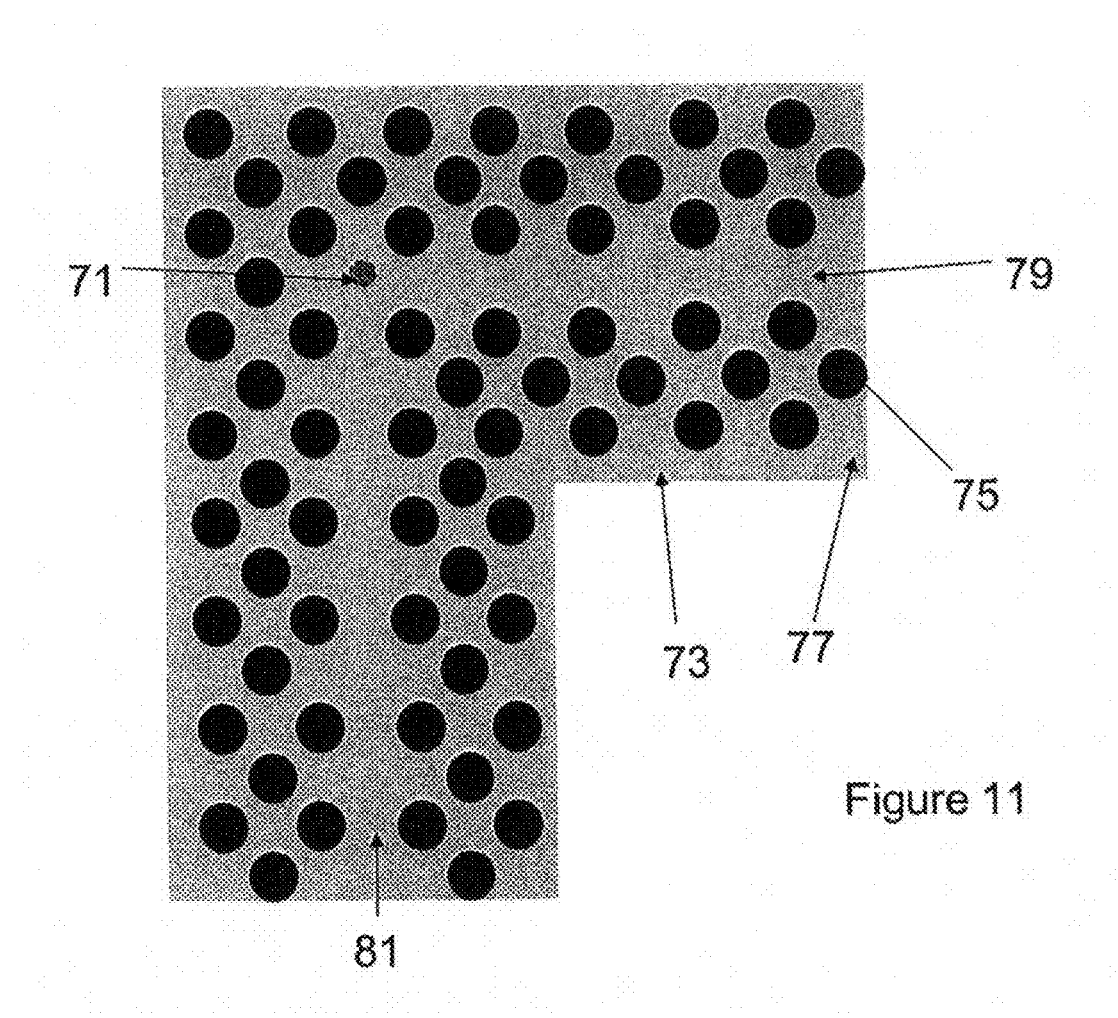
FIG. 11 is a device in accordance with embodiment of the present invention comprising to waveguides formed orthogonal to one another.

FIG. 11 is a schematic of a photon source in accordance with a further embodiment of the present invention. Here, two intersecting waveguides are provided.

Here, the quantum dot 71 is provided in a photonic crystal 73. As in FIG. 8, the photonic crystal structure 73 comprises a plurality of holes 75 which are either empty or filled with a material having a different dielectric constant to that of the surrounding material 77.

Two channels, 79, 81 or row defects are formed as formed from quantum dot to collection optics (not shown). The two channels 79 and 81 are formed in the same plane as the quantum dot 71 and extend at right angles to one another.

In this arrangement horizontally polarised "H" and vertically polarised "V" photons (with dipole moments parallel to channels 79 and 81 respectively) will each couple to only one of the orthogonal waveguides, thus separating entangled photon pairs in spatial mode.

Figure 12A:
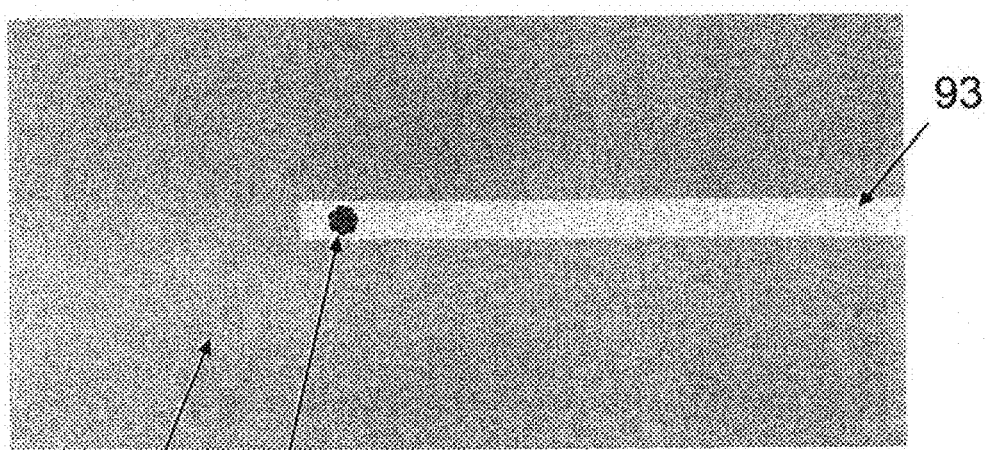
FIG. 12(a) is a plan view from above and FIG. 12(b) is a side view.
Figure 12B:
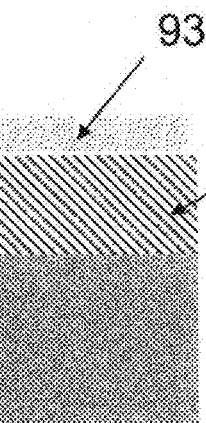

FIG. 12 is a schematic of a ridge waveguide. FIG. 12(a) is a plan view from above and FIG. 12(b) is a side view. The quantum dot, 91 is provided in ridge 93. The waveguide is formed by forming a quantum dot in a layer of semiconductor such as GaAs and etching away the semiconductor except for a narrow stripe incorporating the quantum dot 91.

Vertical confinement could be improved by having the quantum dot 91 within a GaAs layer formed on AlGaAs, then etch away the GaAs apart from the waveguide region, then oxidise the AlGaAs layer. This is illustrated in the side view shown as FIG. 12(b) which shows waveguide 93 overlying oxidised AlGaAs cladding region 97, which makes contact with the GaAs substrate 95. Further more a full cladding could be provided using silicon nitride or similar which has similar refractive index to oxidised AlGaAs.

Figure 13:
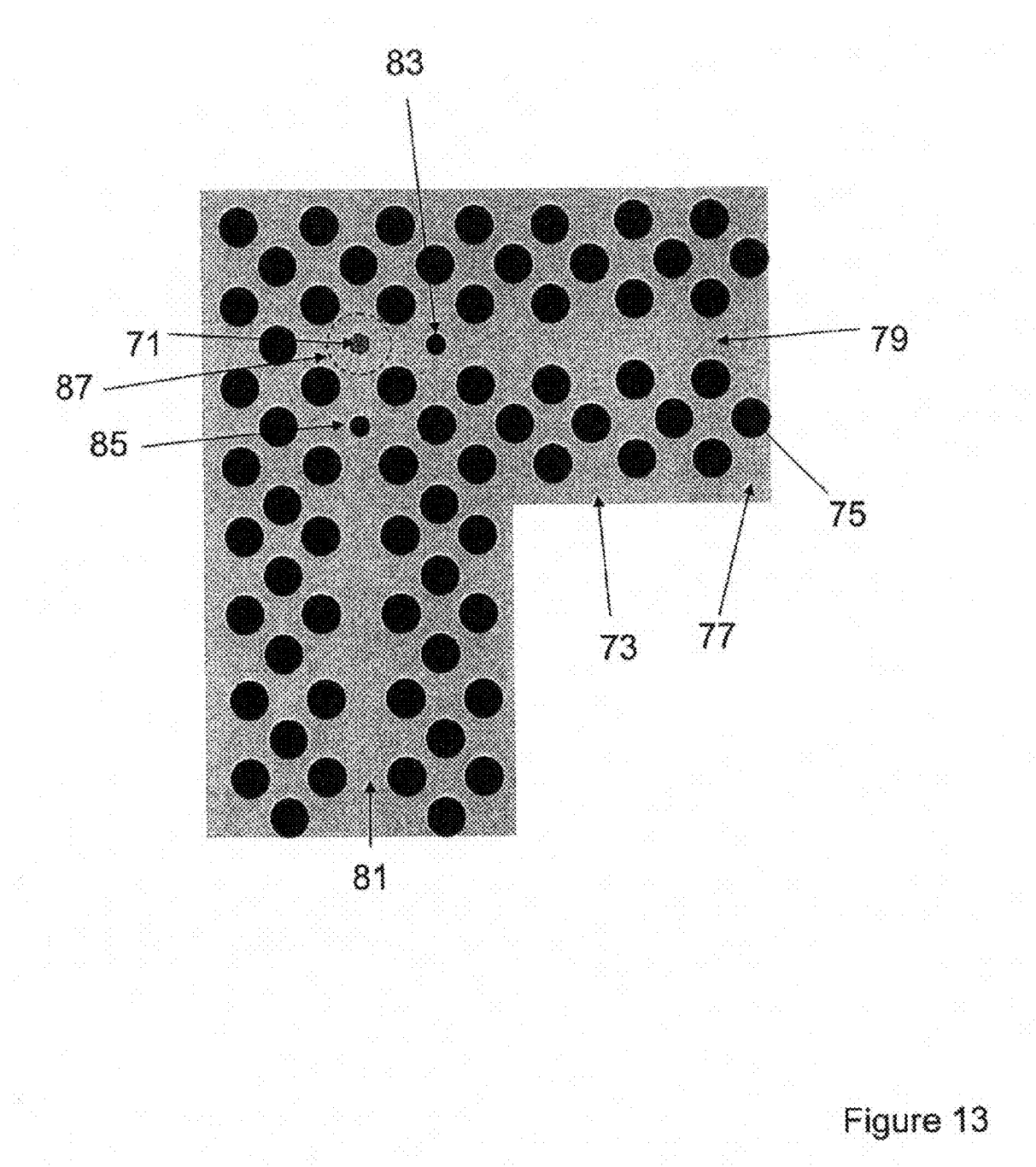
FIG. 13 is a device in accordance with embodiment of the present invention comprising to waveguides formed orthogonal to one another, coupled to an optical cavity.

FIG. 13 is a device in accordance with a further embodiment that includes a cavity region close to the quantum dot, coupled to waveguides. In this embodiment the optical mode that the quantum dot couples into is that of the cavity, which in this example confines light in three dimensions. The cavity optical mode is non-resonant with the quantum dot emission energy, and is detuned at least 1 nm to higher energy. This causes suppression of the spontaneous emission rate of the quantum dot, and the emitted light to leak out of the cavity region into the waveguides.

The device is similar to that of FIG. 11. Where appropriate, like reference numerals have been used to denote like features. The device of this embodiment is arranged as follows. Quantum dot 71 is provided within a photonic crystal membrane, which provides optical confinement in the vertical direction, normal to the plane of the membrane. A photonic crystal pattern of a triangular lattice of round holes 75 of diameter comparable to the wavelength of light is fabricated using standard lithography and etching techniques. Rows of missing holes 79 and 81 define two waveguides in orthogonal directions of the crystal lattice. Modified holes 83 and 85 have position and size selected to define cavity region 87 containing the quantum dot, at the intersection of waveguides 79 and 81. The cavity and waveguide regions may be tuned by removing, resizing, or displacing holes near the boundaries.

Figure 14:
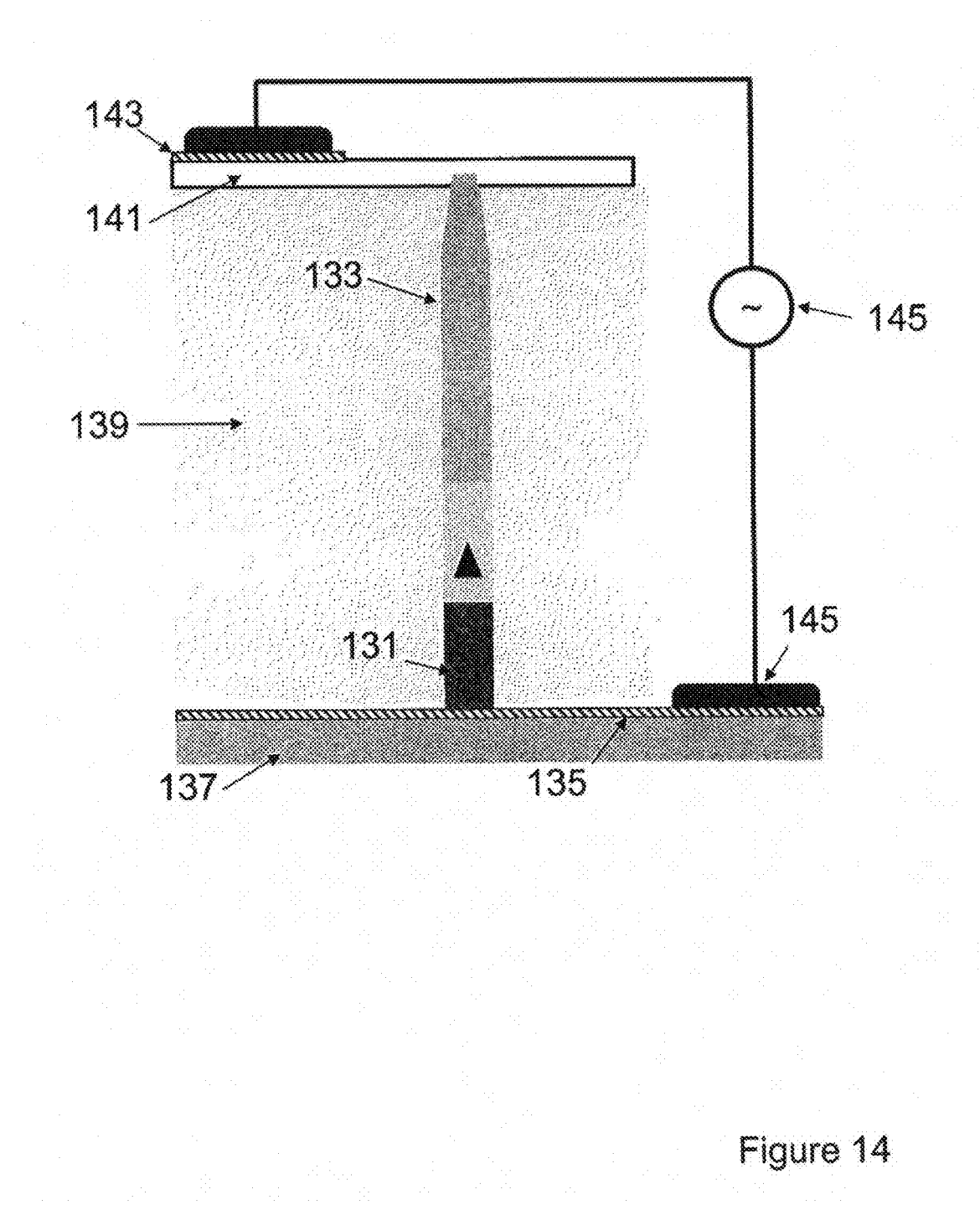
FIG. 14 is a device in accordance with an embodiment of the present invention comprising an electrically driven active region within a waveguide.

FIG. 14 is a device in accordance with a further embodiment of the present invention that illustrates how a quantum dot coupled to a non-resonant waveguide may be electrically driven.

A wafer with quantum dots embedded in GaAs and sandwiched in between n- and p-doped layers 131 and 133 respectively is employed to fabricate an electrically driven nanopillar presented in FIG. 14. The fabrication process does not differ much from the one described above. The n-doped layer 131 is deposited with AuGeNi and annealed to provide a good quality ohmic contact. Gold 135 is evaporated on the surface of the chip to act as a bonding layer to the carrier wafer 137. The thickness of the gold layer 135 must be sufficient so that any roughness introduced by the annealed ohmic contact is smoothed out. The thickness could be 250 nm or more. The chip is then bonded to the carrier wafer and the substrate removed as described above in relation to FIG. 7.

After the nanopillar is etched, the whole chip is planarized with benzocyclobutene (BCB) 139 which acts as a dielectric. The thickness of the BCB should be not more than the height of the nanopillar. The BOB is patterned to provide access to the gold layer 135. This is where the bottom electrode 145 is formed. The top surface of the BOB is sputtered with Indium Tin Oxide (ITO) 141 so that the ITO is in direct contact with the p-type layer of the nanopillar. Finally the top gold electrode 143 is evaporated on the top of the ITO.

The device is operated using signal generator 145. In an embodiment, this will supply voltage pulses of duration shorter than the radiative lifetime of the quantum dot emission, and in a further embodiment shorter than the temporal rejection region, which may be 100 ps. The amplitude and d.c. offset of the pulses is chosen so that the 'off' voltage between pulses is insufficient for injection into the quantum dot to occur, for example around 1.4 V. The 'on' voltage applied during the voltage pulse should be sufficient to inject carriers into the quantum dots, for example above 1.5 V.

Figure 15:
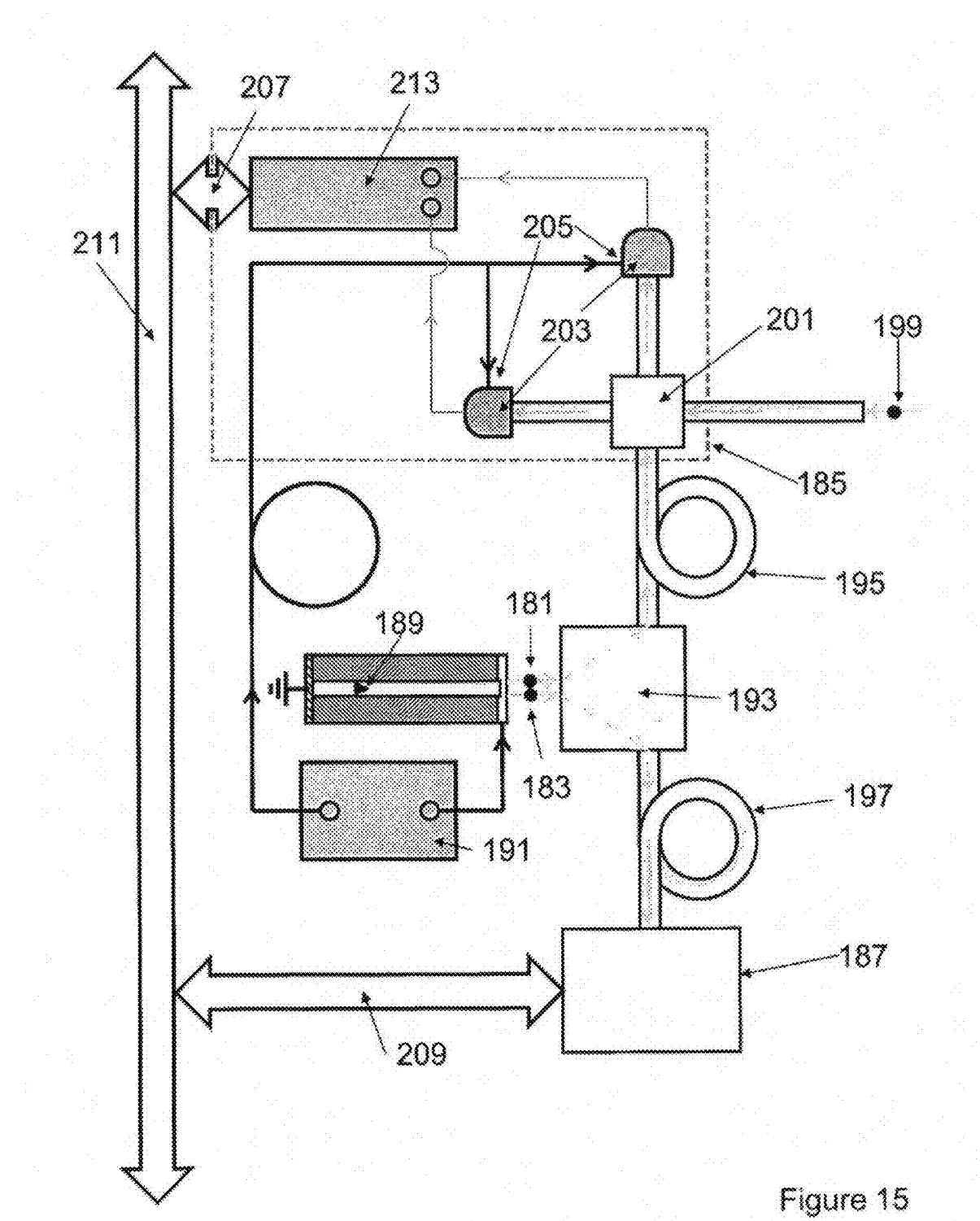
FIG. 15 is a system in accordance with an embodiment of the present invention that may be configured to act as a quantum relay.

FIG. 15 shows an example of an application for a device in accordance with a further embodiment. The quantum relay of FIG. 15 is capable of relaying, via teleportation, the quantum information held on an input qubit photon to a remote receiver, using a pair of entangled photons. Such a system may form part of a secure quantum key distribution system, where its function is often referred to as a quantum relay, which may extend the distance over which secure keys can be formed. It may also be used as part of a distributed quantum computing system, where qubits from one part of the quantum computer can be transmitted to another remote part.

The system of FIG. 15 may be arranged as follows. To facilitate teleportation, a pair of entangled photons 181 and 183 are distributed between an intermediate station 185 and receiver 187.

The entangled photons 181 and 183 are generated by quantum dot 189, which is incorporated within an electrically driven, non-resonant waveguide device similar to that of FIG. 14. The quantum dot is excited electrically with signal generator 191 to generate a sequence of pairs of entangled photons. Entangled photons 181 and 183 correspond to the exciton and biexciton photons of the quantum dot and may be differentiated in energy. Distribution unit 193 captures the emission from the source and separates photons 181 and 183 based on their different emission energies, and distributes them via optical fibres 195 and 197 to intermediate and receiver stations 185 and 187 respectively. Distribution unit 193 may be provided with a lens to capture emission from the source, and wavelength division multiplexing fibre components. Alternatively it may use a grating or dichroic mirror to differentiate the wavelength of photons 181 and 183.

Input photon 199 interacts with entangled photon 181 at intermediate station 185 using interaction optics 201. Interaction optics 201 may comprise polarisation controllers and a non-polarising beamsplitter to allow two photon-interference to occur between photons 199 and 181. The output of interaction optics 201 is sent to two single photon detectors 203. Simultaneous photon detection on detectors 203, measured with coincidence detector 213, indicate that the two-photon Bell state $(|HV\rangle - |VH\rangle)/\sqrt{2}$ has been detected, which allows teleportation to occur. Detectors 203 are electrically gated using gating inputs 205, which are synchronised with signal generator 191 and configured so that detectors 203 are only active after the first 100 ps of emission from the entangled light source. Gating inputs 203 and detectors 201 therefore provide a timing unit which filters the emitted photons based on their emission time and selects photons with better coherence. This in turn allows better two-photon-interference to be resolved, and higher fidelity teleportation to be achieved.

Classical communication between the intermediate and receiver stations using network connections 207 and 209 to network 211, transmits information on which cycles a successful Bell-state measurement was performed, based on which receiver station 187 can determine which photon cycles are required to manipulate, store, measure, or select. Further classical communication between the sending and receiving stations may be required so that the sender knows what portion of the qubit data was received successfully, for example to form the basis of a shared key.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. An optical device comprising a quantum dot provided in a resonant confinement structure, an output from said confinement structure and a pulsed excitation source for said quantum dot, wherein the quantum dot is configured to allow the emission of photons having a first energy in response to a pulse from said excitation source, said resonant confinement structure providing optical confinement, the first energy being different to the resonant energy of the resonant confinement structure, wherein the resonant confinement structure is configured such that photons emitted from the quantum dot are outputted at the output, the optical device further comprising a timing unit, said timing unit being configured to select photons which have been emitted from the quantum dot due to excitation by a pulse, the timing unit selecting photons emitted after the duration of the pulse which caused the emission of the photons.

2. An optical device according to claim 1, wherein the first energy is less than the energy of the resonant energy of the resonant confinement structure.

3. An optical device according to claim 1, wherein said resonant confinement structure is provided by a waveguide.

4. An optical device according to claim 1, wherein said resonant confinement structure comprises a cavity coupled to a quantum dot and said output is provided by a waveguide.

5. An optical device according to claim 1, wherein there is a difference of at least 5 nm between the wavelength corresponding to the first energy and the wavelength corresponding to the resonant energy of the resonant confinement structure.

6. An optical device according to claim 1, wherein the timing unit is configured to select photons emitted 100 ps after the end of the pulse.

7. An optical device according to claim 1, wherein the output comprises at least one selected from a nanopillar, a ridge waveguide or a photonic band gap structure.

8. An optical device according to claim 1, wherein the output comprises a first and second waveguide, the first and second waveguides being located in the same plane and perpendicular to one another, the quantum dot being optically coupled to both waveguides.

9. A quantum relay comprising an optical device according to claim 8, the optical device being configured to output an entangled photon pair, where one photon of the pair is directed towards a first unit and the other photon of the entangled pair is directed towards a second unit, the relay further comprising an input for a photon with a target state to said first unit, the first unit comprising an interferometer and a measuring section, the interferometer configured to interfere the input photon with the target state with a photon of the entangled photon pair and the measurement section configured to measure the interfered photons such that the target state is teleported to the other photon of said entangled pair.

10. An optical device according to claim 1, wherein the pulsed excitation source is an optical source.

11. An optical device according to claim 1, further comprising a detector configured to detect photons emitted from the waveguide, wherein the timing unit is configured to select photons after detection by the detector.

12. An optical device according to claim 11, further comprising a component configured to manipulate the photons emitted by the quantum dot before they reach the detector.

13. An optical device according to claim 12, wherein the component comprises at least one of an acousto-optic-modulator, shutter, or a phase modulator.

14. An optical device according to claim 1, wherein the timing unit comprises a phase modulator.

15. An optical device according to claim 1, wherein said pulsed excitation source supplies an electric pulse.

16. A method of producing photons, said method comprising:
    emitting photons from a quantum dot into a resonant confinement structure using a pulsed excitation source, wherein the quantum dot is configured to allow the emission of photons having a first energy in response to a pulse from said excitation source, said resonant confinement structure providing optical confinement, the first energy being different to the resonant energy of the resonant confinement structure;
    outputting photons emitted from the quantum dot at an output of the resonant confinement structure; and
    selecting photons which have been emitted from the quantum dot due to excitation by a pulse, by temporally selecting photons emitted after the duration of the pulse which caused the emission of the photons.

* * * * *